(12) United States Patent
Chen et al.

(10) Patent No.: US 12,706,543 B2
(45) Date of Patent: Aug. 11, 2026

(54) SWITCH CONTROL CIRCUIT AND POWER CONVERTER COMPRISING THE SAME

(71) Applicant: Chengdu Monolithic Power Systems Co., Ltd., Chengdu (CN)

(72) Inventors: Yuedong Chen, Chengdu (CN); Junlin Qian, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 234 days.

(21) Appl. No.: 18/084,835

(22) Filed: Dec. 20, 2022

(65) Prior Publication Data

US 2023/0231486 A1 Jul. 20, 2023

(30) Foreign Application Priority Data

Jan. 14, 2022 (CN) ........................ 202210040861.7

(51) Int. Cl.
*H02M 3/335* (2006.01)
*H02M 1/088* (2006.01)

(52) U.S. Cl.
CPC ....... *H02M 3/33592* (2013.01); *H02M 1/088* (2013.01)

(58) Field of Classification Search
CPC .. H02M 3/337; H02M 3/3372; H02M 3/3374; H02M 3/3376; H02M 3/3378; H02M 3/338; H02M 3/3381; H02M 3/3382; H02M 3/3384; H02M 3/3385; H02M 3/3387; H02M 3/3388; H02M 1/008; H02M 1/0845; H02M 3/33592
See application file for complete search history.

(56) References Cited

U.S. PATENT DOCUMENTS 6,995,989 B1 * 2/2006 Wang ................ H02M 3/33571 363/21.08
10,840,798 B1 11/2020 Jelaca
2004/0105287 A1 * 6/2004 Choi .................. H05B 41/3925 363/131
2006/0171179 A1 * 8/2006 Hall .................. H02M 3/33507 363/95
2006/0196757 A1 * 9/2006 Choi ..................... H02M 3/335 200/50.38
2012/0163047 A1 * 6/2012 Kubota ................... H02M 1/36 323/275
2017/0201183 A1 * 7/2017 Chen ................ H02M 3/33546
(Continued)

FOREIGN PATENT DOCUMENTS

CN 116131586 5/2023

*Primary Examiner* — Nguyen Tran
(74) *Attorney, Agent, or Firm* — Ashurst Perkins Coie US LLP

(57) ABSTRACT

A power converter includes a switch control circuit for driving a high side switch of the power converter comprising the high side switch and a low side switch connected in series. The switch control circuit may have a first terminal for receiving an input signal, a second terminal used as a reference ground terminal of the switch control circuit, and a third terminal used as an output terminal to provide a driving signal, the switch control circuit can draw power from the input signal and may be configured to control a logic state of the driving signal based on a logic state of the input signal relative to a reference ground signal at the second terminal or based on a current flowing through the first terminal.

20 Claims, 3 Drawing Sheets

(56) References Cited

U.S. PATENT DOCUMENTS

| | | | | |
|---|---|---|---|---|
| 2020/0343818 | A1* | 10/2020 | Lin | H02M 3/33569 |
| 2023/0179081 | A1* | 6/2023 | Li | H02M 1/0006 363/21.01 |

* cited by examiner

SWITCH CONTROL CIRCUIT AND POWER CONVERTER COMPRISING THE SAME

CROSS REFERENCE

This application claims the benefit of CN application No. 202210040861.7 filed on Jan. 14, 2022 and incorporated herein by reference.

TECHNICAL FIELD

The present invention generally relates to integrated circuits, and more particularly but not exclusively, to power converters and switch control circuits.

BACKGROUND OF THE INVENTION

As shown in FIG. 1, conventional gate drivers (e.g. high side gate driver 12 and low side gate driver 13 in FIG. 1) for a half bridge 11 need their own power supply circuitries. The half bridge 11 in FIG. 1 is shown as including a series electrically coupled high side power transistor QH and a low side power transistor QL. Typically, especially for driving the high side power transistor QH, a bootstrap circuitry (e.g. comprising bootstrap diode DB and bootstrap capacitor CB) is needed to generate a bootstrap voltage VB and the bootstrap circuitry should be powered by an auxiliary voltage VP conventionally generated by charging a capacitor Caux from an auxiliary winding Laux of the transformer T through a diode Daux. The auxiliary voltage VP or the bootstrap voltage VB generally needs to be regulated to a lower internal supply voltage VDD by internal regulators (e.g. LDO etc.) in the gate drivers (e.g. 12 and 13 in FIG. 1) to supply other internal circuits (such as logic control circuit etc.) in the gate drivers. Also, extra pins or circuits (such as synchronization pins SYNC of high side gate driver 12 and low side gate driver 13 and synchronization circuitry inside the high side gate driver 12 in FIG. 1) are needed to synchronize high-side gate driving signal VGH and low-side gate driving signal VGL which are respectively used to drive the high side power transistor QH and the low side power transistor QL. The internal regulators and synchronization circuitries need to sustain high voltage (e.g. up to 100V or higher) in most AC-DC applications, which increases the design complexity and cost.

SUMMARY OF THE INVENTION

Embodiments of the present invention are directed to a switch control circuit comprising: a first terminal, a second terminal and a third terminal. The first terminal may be configured as an input terminal of the switch control circuit to receive an input signal. The second terminal may be configured as a reference ground terminal of the switch control circuit. The third terminal may be configured as an output terminal of the switch control circuit to provide a driving signal adapted to be configured to drive a power switch to perform on and off switching. The switch control circuit may be configured to draw power from the input signal received at the first terminal, and further configured to control a logic state of the driving signal based on a logic state of the input signal relative to a reference ground signal at the second terminal or based on a current flowing through the first terminal.

Embodiments of the present invention are also directed to a power converter comprising: a first switch having a first terminal, a second terminal and a control terminal and a second switch having a first terminal, a second terminal and a control terminal. The first terminal of the first switch may be coupled to an input terminal of the power converter. The first terminal of the second switch may be coupled to the second terminal of the first switch to form a common connection. The second terminal of the second switch may be coupled to a reference ground of the power converter. The power converter may also comprise a first switch control circuit having a first terminal, a second terminal and a third terminal. The first terminal of the first switch control circuit may be configured to receive an input signal. The second terminal of the first switch control circuit may be coupled to the common connection. The third terminal of the first switch control circuit may be coupled to the control terminal of the first switch. The first switch control circuit may be configured to draw power from the input signal and to detect whether the second switch is ON or OFF based on a logic state of the input signal relative to a reference ground signal at its second terminal or based on a current flowing through its first terminal.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

In the following detailed description of the present invention, numerous specific details about circuits, components and methods are set forth in order to provide a thorough understanding of the present invention. However, it will be obvious to one of ordinary skill in the art that the present invention may be practiced without these specific details. In other instances, well-known details have not been described so as not to unnecessarily obscure aspects of the present invention.

Figure 2:
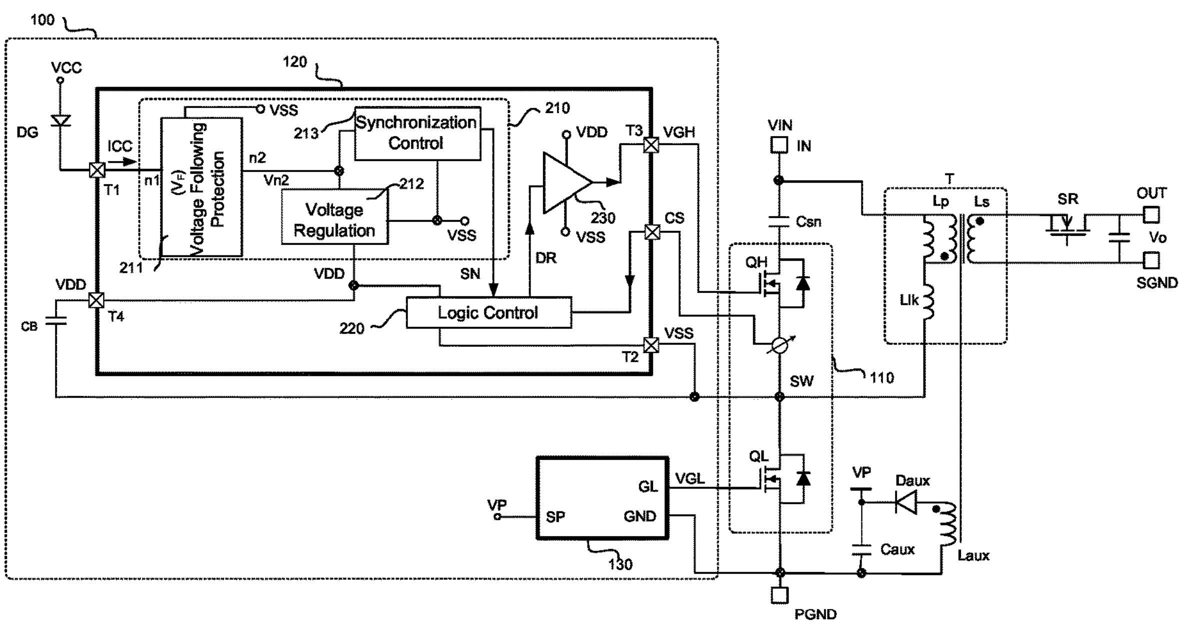
FIG. 2 schematically illustrates a power converter 100 in accordance with an embodiment of the present invention.

FIG. 2 schematically illustrates a power converter 100 in accordance with an embodiment of the present invention. The power converter 100 may include a half bridge switching circuit 110 comprising a high side switch QH and a low side switch QL. The high side switch QH may have a first terminal, a second terminal and a control terminal, wherein the first terminal of the high side switch QH may be coupled to an input terminal VIN of the power converter 100. The low side switch QL may also have a first terminal, a second terminal and a control terminal, wherein the first terminal of the low side switch QL may be coupled to the second terminal of the high side switch QH to form a common connection SW, and wherein the second terminal of the low side switch QL may be coupled to a reference ground (PGND) of the power converter 100.

As shown in the example of FIG. 2, the power converter 100 may further comprise a high side switch control circuit 120 (which may also be referred to as a first switch control circuit) configured to control the high side switch QH. The high side switch control circuit 120 may comprise a first terminal T1 configured as a supply terminal or a supply pin of the high side switch control circuit 120, a second terminal T2 configured as a reference ground terminal or a reference ground pin of the high side switch control circuit 120, and a third terminal T3 configured as an output terminal or an output pin of the high side switch control circuit 120 to provide a high side switch driving signal VGH (which may also be referred to as a first switching driving signal). In accordance with an embodiment of the present invention, the second terminal T2 of the high side switch control circuit 120 may be coupled to the common connection SW. The high side switch driving signal VGH may have a reset logic state (e.g. logic low) to drive the high side switch QH OFF and a set logic state (e.g. logic high) to drive the high side switch QH ON. The high side switch control circuit 120 may be configured to draw power from an input signal (which may labeled and referred to as VCC) received at the first terminal T1 to power the high side switch control circuit 120.

In accordance with an exemplary embodiment of the present invention, the power converter 100 may further comprise a low side switch control circuit 130 (which may also be referred to as a second switch control circuit) to control the low side switch QL. In one embodiment, the low side switch control circuit 130 may include a first terminal SP configured to receive a power supply voltage VP, a second terminal GND configured to be used as a ground terminal and that may be coupled to the reference ground PGND of the power converter 100, and a third terminal GL configured to provide the low side switch driving signal VGL which may be used to enable/allow the low side switch QL to perform ON and OFF switching.

In accordance with an exemplary embodiment of the present invention, the power converter 100 may further comprise an inductive energy storage device T which is exemplarily illustrated as a transformer having a primary winding Lp and a secondary winding Ls in FIG. 2. The primary winding Lp may be coupled between the input terminal VIN of the power converter 100 and the common connection SW of the high side switch QH and the low side switch QL. A leakage inductance of the transformer T is illustratively represented by an element labeled with Llk in this example. The secondary winding Ls may comprise a first terminal and a second terminal, wherein the first terminal may be coupled to an output terminal OUT of the power converter 100 through a synchronous rectifier SR (e.g. comprising a MOSFET), and wherein the second terminal may be coupled to a secondary reference ground SGND of a secondary side of the power converter 100. An output capacitive energy storage device Co may be coupled between the output terminal OUT and the secondary reference ground SGND of the power converter 100. In the exemplary embodiment of FIG. 2, the power converter 100 is illustrated to have a flyback converter topology. The power supply voltage VP for supplying the low side switch control circuit 130 may be generated from an auxiliary winding Laux of the transformer T which is inductively coupled to the primary winding Lp and the secondary winding Ls of the transformer T. A diode Daux and a capacitor Caux may be coupled between a first terminal and a second terminal of the auxiliary winding Laux. A voltage across the capacitor Caux may be provided as the power supply voltage VP.

In accordance with an exemplary embodiment of the present invention, the input signal VCC received at the first terminal T1 of the high side switch control circuit 120 may include the power supply voltage VP. In another embodiment of the present invention, the input signal VCC received at the first terminal T1 of the high side switch control circuit 120 may include the low side switch driving signal VGL. According to another embodiment of the present invention, the input signal VCC received at the first terminal T1 of the high side switch control circuit 120 may include any other signal capable of providing electrical power. In accordance with an exemplary embodiment of the present invention, the first terminal T1 of the high side switch control circuit 120 may be configured to receive the input signal VCC through a one direction conductive device DG. The one direction conductive device DG may be conductive in a direction into the first terminal T1 of the high side switch control circuit 120 and reverse-blocked in a direction out of the first terminal T1 of the high side switch control circuit 120. The one direction conductive device DG may have a reverse breakdown voltage higher than a predetermined voltage value, for example the predetermined voltage value may be determined by a maximum voltage difference between the input signal VCC and a reference ground signal VSS at the second terminal T2. To provide an example, for a typical application where an input voltage of 380V is provided at the input terminal VIN of the power converter 100 with an output voltage of 20V desired to be provided at the output terminal OUT and the turns ratio between the primary winding Lp and the secondary winding Ls is 8, the turns ratio between the auxiliary winding Laux and the secondary winding Ls is 2, if the power supply voltage VP is provided as the input signal VCC, the maximum voltage difference between the input signal VCC and the reference ground signal VSS may reach 500V at a moment when the low side switch is turned OFF, and if the low side switch driving signal VGL is provided as the input signal VCC, the maximum voltage difference between the input signal VCC and the reference ground signal VSS may reach 530V at the moment when the low side switch is turned OFF, thus, it may be reasonable to choose the one direction conductive device DG having a reverse breakdown voltage for example of 600V or 700V to protect the high side switch control circuit 120 from being damaged at the moment when the low side switch is turned OFF.

In accordance with an embodiment of the present invention, the high side switch control circuit 120 may be further configured to implement high side switch control and low side switch control synchronization/communication through the first terminal T1. High side switch control and low side switch control synchronization/communication is essential to prevent the high side switch QH and low side switch QL being ON at the same time. In one embodiment of the present invention, the high side switch control circuit 120 may be adapted to be configured to detect whether the low side switch QL is ON or OFF based on the a logic state of the input signal VCC received at the first terminal T1 relative to (or with reference to) the reference ground signal VSS at the second terminal T2, thereby realizing high side switch control and low side switch control synchronization/communication. For example, in one embodiment, the high side switch control circuit 120 may be configured to determine that the low side switch QL is ON when the input signal VCC is logic high relative to the reference ground signal VSS. Further, in one embodiment, the high side switch control circuit 120 may be configured to determine that the low side switch QL is ON when a duration of the input signal VCC being logic high relative to the reference ground signal VSS is longer than a predetermined period td. The predetermined period td may be set depending on real application requirements and application parameters of the power converter 100. In an alternative embodiment, the high side switch control circuit 120 may be configured to detect whether the low side switch is ON or OFF based on a current flowing through the first terminal T1 (which may be labeled and referred to as ICC) to realize high side switch control and low side switch control synchronization/communication. For example, in one embodiment, the high side switch control circuit 120 may be configured to determine that the low side switch QL is ON when the current ICC flowing through the first terminal T1 is higher than a predetermined current value I1. In one embodiment, the predetermined current value I1 may be in the range of 1 mA to 15 mA, in another example may be in the range of 3 mA to 15 mA, or in still another example may be in the range of 10 mA to 15 mA. Further, in one embodiment, the high side switch control circuit 120 may be configured to determine that the low side switch QL is ON when the duration of the current ICC flowing through the first terminal T1 being higher than the predetermined current value I1 is longer than the predetermined period td.

Figure 1:
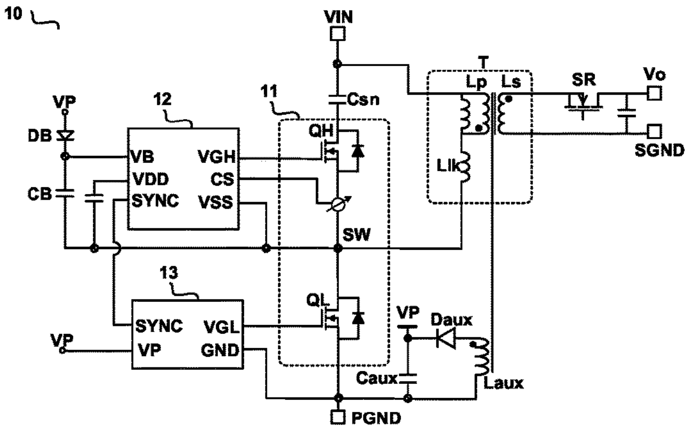
FIG. 1 is a block diagram of a conventional fly-back converter 10.

Therefore, the high side switch control circuit 120 according to various embodiments of the present invention can use the single terminal T1 to function as its supply terminal or supply pin to draw power as well as its synchronization/communication terminal to realize high side switch control and low side switch control synchronization/communication. In comparison with the conventional gate drivers (e.g. 12 in FIG. 1) needing two separate terminals/pins respectively for power supply and synchronization control, the high side switch control circuit 120 can at least save one I/O terminal/pad when integrated on a semiconductor die or at least save one pin when packaged in an integrated circuit chip. This is cost effective and size saving.

According to an exemplary embodiment of the present invention, the high side switch control circuit 120 disable the high side switch QH to keep it OFF when the high side switch control circuit 120 determines that the low side switch QL is ON, thereby preventing the high side switch QH and low side switch QL being ON at the same time.

In one exemplary embodiment of the present invention, the high side switch control circuit 120 may be configured to detect whether the low side switch QL is ON or OFF based on the logic state of the input signal VCC relative to the reference ground signal VSS at the second terminal T2. According to an exemplary embodiment of the present invention, the high side switch control circuit 120 may be configured to determine that the low side switch QL is OFF when the input signal VCC is logic low relative to the reference ground signal VSS at the second terminal T2. According to an exemplary embodiment of the present invention, the high side switch control circuit 120 may be configured to determine that the low side switch QL is OFF when the logic state of the input signal VCC changes from logic high to logic low relative to the reference ground signal VSS at the second terminal T2. The high side switch control circuit 120 may be configured to enable/allow the high side switch QH to perform ON and OFF switching when the high side switch control circuit 120 determines that the low side switch QL is OFF (e.g. when the input signal VCC is logic low relative to the reference ground signal VSS at the second terminal T2 or when the logical state of the input signal VCC changes from logic high to logic low relative to the reference ground signal VSS at the second terminal T2).

In accordance with an exemplary embodiment of the present invention, the high side switch control circuit 120 may further comprise a fourth terminal T4 configured to provide a regulated voltage signal VDD when a capacitive energy storage device CB is coupled between the fourth terminal T4 and the second terminal T2 of the high side switch control circuit 120.

In accordance with an exemplary embodiment of the present invention, the high side switch control circuit 120 may further comprise a power supply/synchronization unit 210 coupled to the first terminal T1, the second terminal T2 and the fourth terminal T4 of the high side switch control circuit 120. The power supply/synchronization unit 210 may be configured to provide the regulated voltage signal VDD based on the input signal VCC received at the first terminal T1 when the capacitive energy storage device CB is coupled between the fourth terminal T4 and the second terminal T2 of the high side switch control circuit 120. According to an exemplary embodiment of the present invention, the power supply/synchronization unit 210 may be further configured to generate a synchronization control signal SN based on the input signal VCC received at the first terminal T1, wherein the synchronization control signal SN has a disable logic state (e.g. logic high) which indicates that the low side switch QL is ON and an enable logic state (e.g. logic low) which indicates that the low side switch QL is OFF. In one embodiment, the power supply/synchronization unit 210 may allow the synchronization control signal SN to be at the disable logic state when the input signal VCC is logic high relative to the reference ground signal VSS (or when the duration of the input signal VCC being logic high relative to the reference ground signal VSS is longer than the predetermined period td). In an alternative embodiment, the power supply/synchronization unit 210 may allow the synchronization control signal SN to be at the disable logic state when the current ICC flowing through the first terminal T1 is higher than a predetermined current value I1 (or when the duration of the current ICC flowing through the first terminal T1 being higher than the predetermined current value I1 is longer than the predetermined period td). In one embodiment, the power supply/synchronization unit 210 may allow the synchronization control signal SN to be at the enable logic state when the input signal VCC is logic low relative to the reference ground signal VSS or when the logic state of the input signal VCC changes from logic high to logic low relative to the reference ground signal VSS.

According to an exemplary embodiment of the present invention, if the input signal VCC received at the first terminal T1 of the high side switch control circuit 120 is, for example, the low side switch driving signal VGL, then the power supply/synchronization unit 210 may comprise a voltage regulation module 212 and a synchronization control module 213. Since the low side switch driving signal VGL generally has a well-regulated voltage amplitude for instance in the range of 10V~20V relative to the reference ground potential PGND of the power converter 100, the high side switch control circuit 120 may not require the power supply/synchronization unit 210 that should sustain high voltage. "High voltage" here in an example may refer to voltages higher than the voltage amplitude of the low side switch driving signal VGL (e.g. 10V~20V), in another example may refer to voltages even higher than 20V up to 100V, or in still another example may refer to voltages higher than 100V up to 1500V. Thus, the voltage regulation module 212 and the synchronization control module 213 may be comprised of low voltage devices. "Low voltage devices" here in an example may refer to devices having breakdown voltages or rated operating voltages lower than the voltage amplitude of the low side switch driving signal VGL. Low voltage devices are not only cost effective and size saving but also help to reduce design complexity and power dissipation. The voltage regulation module 212 may be coupled to the first terminal T1, the second terminal T2 and the fourth terminal T4 of the high side switch control circuit 120, and may be configured to convert the input signal VCC to the regulated voltage signal VDD when the capacitive energy storage device CB is coupled between the fourth terminal T4 and the second terminal T2 of the high side switch control circuit 120. The synchronization control module 213 may be coupled to the first terminal T1 and the second terminal T2 of the high side switch control circuit 120, and may be configured to generate the synchronization control signal SN based on the input signal VCC and the reference ground signal VSS. In one embodiment, the synchronization control module 213 may be configured to allow the synchronization control signal SN to be at the disable logic state when the input signal VCC is logic high relative to the reference ground signal VSS (or when the duration of input signal VCC being logic high relative to the reference ground signal VSS is longer than the predetermined period td). In an alternative embodiment, the synchronization control module 213 may be configured to allow the synchronization control signal SN to be at the disable logic state when the current ICC flowing through the first terminal T1 is higher than the predetermined current value I1 (or when the duration of the current ICC flowing through the first terminal T1 being higher than the predetermined current value I1 is longer than the predetermined period td). In one embodiment, the synchronization control module 213 may be configured to allow the synchronization control signal SN to be at the enable logic state when the input signal VCC is logic low relative to the reference ground signal VSS or when the logic state of the input signal VCC changes from logic high to logic low relative to the reference ground signal VSS.

According to an exemplary embodiment of the present invention, if the input signal VCC received at the first terminal T1 of the high side switch control circuit 120 is, for example, the power supply voltage VP, then the power supply/synchronization unit 210 may further comprise a voltage following protection module 211 having breakdown voltages higher than the maximum voltage difference between the input signal VCC and the reference ground signal VSS. The voltage following protection module 211 may be used to protect circuitries (for example, the voltage regulation module 212 and the synchronization control module 213) from being damaged when voltage difference between the input signal VCC and the reference ground signal VSS is too high. In this example, the voltage regulation module 212 and the synchronization control module 213 may be coupled to the first terminal T1 through the voltage following protection module 211. The voltage following protection module 211 may include a following input n1 and a following output n2, wherein the following input n1 may be coupled to the first terminal T1, and wherein the voltage following protection module 211 may be configured to generate a following output signal Vn2 at the following output n2 based on the input signal VCC. Using the reference ground signal VSS as a reference, the voltage following protection module 211 may be configured to allow the following output signal Vn2 to follow the input signal VCC when the voltage difference between the input signal VCC and the reference ground signal VSS is lower than a first predetermined voltage $V_F$, and may allow the following output signal Vn2 to stop following the input signal VCC when the voltage difference between the input signal VCC and the reference ground signal VSS is higher than the first predetermined voltage $V_F$. In one embodiment, the first predetermined voltage $V_F$ may be in the range of 5V to 20V, in another embodiment may be in the range of 6V to 15V, in one embodiment may be in the range of 6V to 12V, in another embodiment may be in the range of 6V to 10V, in one embodiment may be in the range of 8V to 10V. One of ordinary skill in the art would understand, "the following output signal Vn2 follows the input signal VCC" may refer to that the following output signal Vn2 changes in line with the voltage difference between the input signal VCC and the reference ground signal VSS and "the following output signal Vn2 stops following the input signal VCC" may refer to that the following output signal Vn2 no longer changes in line with the voltage difference between the input signal VCC and the reference ground signal VSS. Therefore, in one embodiment of the present invention, if $|VCC-VSS| \le V_F$, then Vn2≈VC, if $|VCC-VSS| > V_F$, then Vn2 remains unchanged. In this example, the voltage regulation module 212 may be coupled to the following output n2 of the voltage following protection module 211, the second terminal T2 and the fourth terminal T4 of the high side switch control circuit 120. The voltage regulation module 212 may be configured to convert the following output signal Vn2 to the regulated voltage signal VDD when the capacitive energy storage device CB is coupled between the fourth terminal T4 and the second terminal T2 of the high side switch control circuit 120. The synchronization control module 213 may be coupled to the following output n2 of the voltage following protection module 211 and the second terminal T2 of the high side switch control circuit 120. The synchronization control module 213 may be configured to generate the synchronization control signal SN based on the following output signal Vn2.

Figure 3:
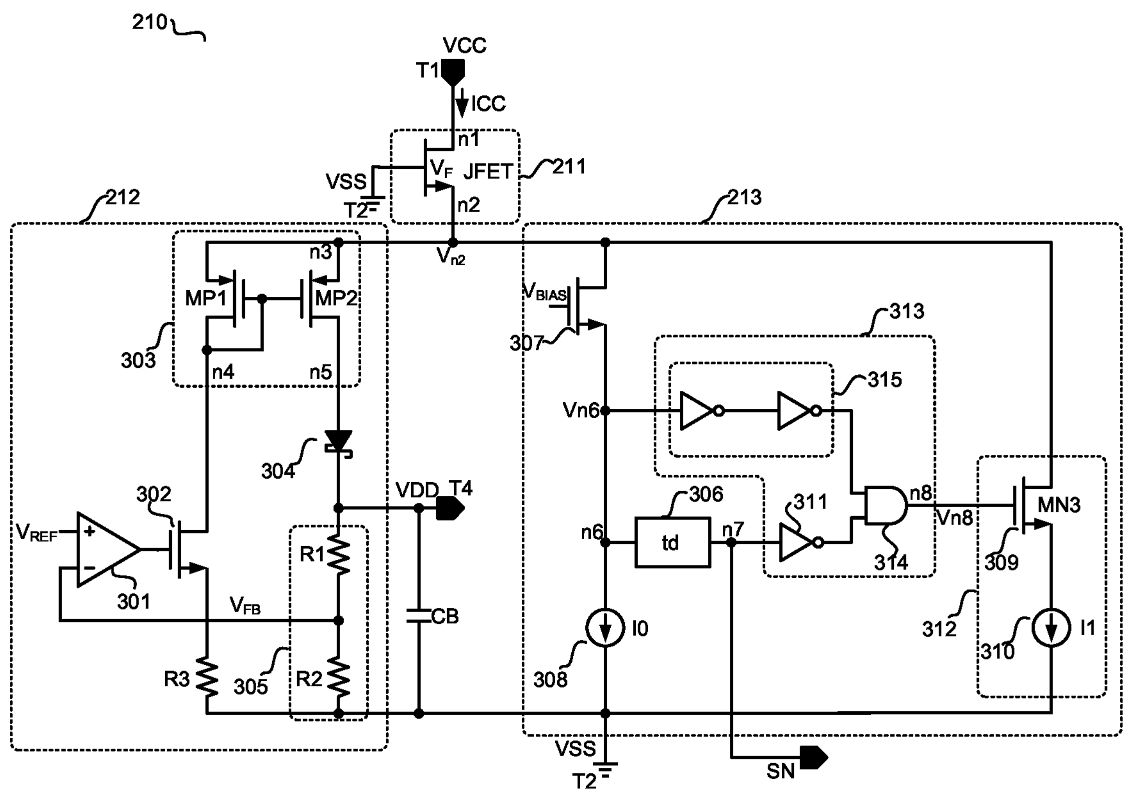
FIG. 3 schematically illustrates a power supply/synchronization unit 210 in accordance with an embodiment of the present invention.

FIG. 3 schematically illustrates a power supply/synchronization unit 210 with more details in accordance with an embodiment of the present invention. The power supply/synchronization unit 210 comprising the voltage following protection module 211 is taken as an example in FIG. 3. In the exemplary embodiment of FIG. 3, the voltage following protection module 211 may comprise, for example, a high-voltage junction field effect transistor ("JFET") having a pinch-off voltage which may be used as the first predetermined voltage $V_F$. A drain terminal of the high-voltage JFET may be coupled to the first terminal T1 and may be used as the following input n1. A source terminal of the high-voltage JFET may be used as the following output n2. A gate terminal of the high-voltage JFET may be coupled to the second terminal T2. When the voltage difference between the input signal VCC received at the first terminal T1 and the reference ground signal VSS at the second terminal T2 is lower than the pinch-off voltage of the high-voltage JFET (which is the first predetermined voltage $V_F$ in this embodiment), the high-voltage JFET turns on and the following output signal Vn2 generated at the source terminal (which is the following output n2 in this embodiment) follows the input signal VCC at the drain terminal (which is the following input n1 in this embodiment). When the voltage difference between the input signal VCC received at the first terminal T1 and the reference ground signal VSS at the second terminal T2 is higher than the pinch-off voltage of the high-voltage JFET (which is the first predetermined voltage $V_F$ in this embodiment), the high-voltage JFET pinches off and the following output signal Vn2 generated at the source terminal (which is the following output n2 in this embodiment) stops following the input signal VCC at the drain terminal (which is the following input n1 in this embodiment), the following output signal Vn2 no longer increases as the input signal VCC increases. The voltage following protection module 211 may have a breakdown voltage higher than the maximum voltage difference between the input signal VCC and the reference ground signal VSS. To provide an example, for a typical application where an input voltage of 380V is provided at the input terminal VIN of the power converter 100 with an output voltage of 20V desired to be provided at the output terminal OUT and the turns ratio between the primary winding Lp and the secondary winding Ls is 8, the turns ratio between the auxiliary winding Laux and the secondary winding Ls is 2, if the power supply voltage VP is provided as the input signal VCC, the maximum voltage difference between the input signal VCC and the reference ground signal VSS may reach 40V at a moment when the low side switch is turned ON, thus, in this example, it may be reasonable to choose the voltage following protection module 211 (e.g. the high-voltage JFET) having the reverse breakdown voltage higher than 40V. If the low side switch driving signal VGL is provided as the input signal VCC, the maximum voltage difference between the input signal VCC and the reference ground signal VSS may be in the range of 10V~20V at the moment when the low side switch is turned ON, thus, the power supply/synchronization unit 210 may not need the voltage following protection module 211.

One of ordinary skill in the art should understand that using the high-voltage JFET illustrated in FIG. 3 as the voltage following protection module 211 is just to provide an example and not intended to be limiting. The voltage following protection module 211 may comprise any appropriate device or circuitry that can allow the following output signal Vn2 to follow the input signal VCC when the voltage difference between the input signal VCC and the reference ground signal VSS is lower than the first predetermined voltage $V_F$, and allow the following output signal Vn2 to stop following the input signal VCC when the voltage difference between the input signal VCC and the reference ground signal VSS is higher than the first predetermined voltage $V_F$. The voltage following protection module 211 can protect the circuitry coupled to the following output n2 (e.g. the voltage regulation module 212 and the synchronization control module 213) from being damaged when voltage difference between the input signal VCC and the reference ground signal VSS is too high.

According to the exemplary embodiment of FIG. 3, the voltage regulation module 212 may include: an operational amplifier 301, an adjustment transistor 302, a current mirror 303, a one direction conductive device 304, and an adjustment feedback circuit 305. The operational amplifier 301 may be configured to receive a reference voltage $V_{REF}$ at its first terminal (e.g. the inverting input terminal "−" in FIG. 3), to be coupled to the adjustment feedback circuit 305 to receive an adjustment feedback voltage $V_{FB}$ which indicates the regulated voltage signal VDD at its second terminal (e.g. the non-inverting input terminal "+" in FIG. 3), and configured to be coupled to a control terminal of the adjustment transistor 302 at its output terminal. A first terminal of the adjustment transistor 302 may be coupled to an output terminal n4 of the current mirror 303, a second terminal of the adjustment transistor 302 may be coupled to the second terminal T2 (in other words, be coupled to the reference ground signal VSS). A source terminal n3 of the current mirror 303 may be coupled to the following output n2 of the voltage following protection module 211 (or coupled to the first terminal T1 when used in the embodiment which do not include the voltage following protection module 211), a mirror output terminal n5 of the current mirror 303 may be coupled to the fourth terminal T4 through the one direction conductive device 304. In the embodiment of FIG. 3, the one direction conductive device 304 may be conductive in a direction from the mirror output terminal n5 to the fourth terminal T4 and reverse-blocked in a direction from the fourth terminal T4 to the mirror output terminal n5 to prevent any current backflowing from the fourth terminal T4 to the first terminal T1 (in other words, to prevent the regulated voltage signal VDD discharging to the first terminal T1). In the exemplary embodiment of FIG. 3, the current mirror 303 is schematically illustrated to have a first mirror transistor MP1 and a second mirror transistor MP2. In the exemplary embodiment of FIG. 3, the adjustment feedback circuit 305 is schematically illustrated to have a series connected feedback resistor R1 and feedback resistor R2 coupled between the second terminal T2 and the fourth terminal T4. A voltage potential at a common connection of the feedback resistor R1 and feedback resistor R2 may be used to provide the adjustment feedback voltage $V_{FB}$. In the exemplary embodiment of FIG. 3, the second terminal of the adjustment transistor 302 may be coupled to the second terminal T2 through an adjustment resistor R3 to limit the maximum current flowing through the adjustment transistor 302. If the current flowing through the adjusting transistor 302 and the adjusting resistor R3 exceeds this maximum current, a large voltage generated across the adjusting resistor R3 will cut off/shut down the adjusting transistor 302. In other embodiments, the adjustment resistor R3 may not be included.

According to the exemplary embodiment of FIG. 3, the synchronization control module 213 may comprise a timing/filter circuit 306. The timing/filter circuit 306 may be configured to be coupled to the following output n2 of the voltage following protection module 211 (or coupled to the first terminal T1 when used in embodiments which do not include a voltage following protection module 211) at its input terminal n6, thus a signal at the input terminal n6 (e.g. labeled as Vn6) can indicate the logic state of the input signal VCC relative to the reference ground signal VSS, which is referred to as a logic state characterization signal Vn6 hereinafter. Using the reference ground signal VSS as a reference, the logic state of the logic state characterization signal Vn6 is consistent with the logic state of the input signal VCC or the following output signal Vn2. The timing/filter circuit 306 may be configured to start to time the duration the input signal VCC being logic high relative to the reference ground signal VSS from the moment when the logic state of the input signal VCC changes to logic high relative to the reference ground signal VSS (i.e., at the rising edge of input signal VCC relative to a reference ground signal VSS). If the duration of the input signal VCC being logic high relative to the reference ground signal VSS is shorter than the predetermined period td, the timing/filter circuit 306 may be configured to allow the synchronization control signal SN at its output terminal n7 to be at the enable logic state, and if the duration the input signal VCC being logic high relative to the reference ground signal VSS is longer than the predetermined period td, the timing/filter circuit 306 may be configured to allow the synchronization control signal SN at its output terminal n7 to be at the disable logic state. The timing/filter circuit 306 may be configured to allow the synchronization control signal SN to be at the enable logic state when the input signal VCC is logic low relative to the reference ground signal VSS (or when the logic state of the input signal VCC changes from logic high to logic low relative to a reference ground signal VSS).

Figure 4:
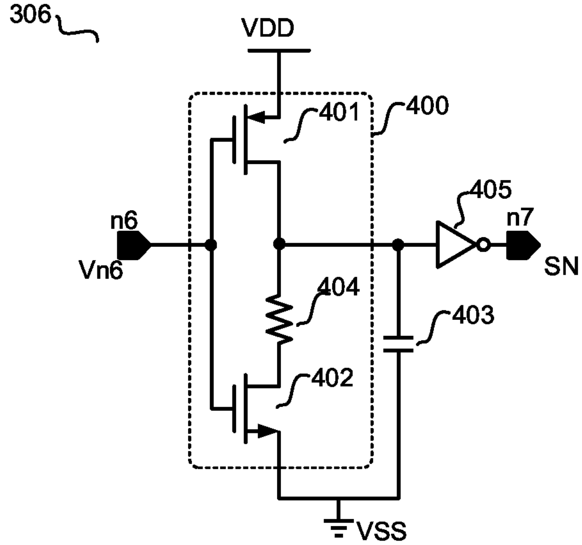
FIG. 4 schematically illustrates a timing/filter circuit 306 in accordance with an embodiment of the present invention.

FIG. 4 schematically illustrates the timing/filter circuit 306 in accordance with an embodiment of the present invention. In the embodiment of FIG. 4, the timing/filter circuit 306 may comprise: a push-pull circuit 400 comprised of a first transistor 401 (may be a P type field effect transistor as illustrated in FIG. 4) and a second transistor 402 (may be an N type field effect transistor as illustrated in FIG. 4), a timing/filter capacitor 403 and an inverter 405. A first terminal (e.g. a source terminal) of the first transistor 401 may be coupled to the regulated voltage signal VDD (e.g. may be coupled to the regulated voltage signal VDD through an internal low dropout regulator). A second terminal (e.g. a drain terminal) of the first transistor 401 may be coupled to a first terminal (e.g. a drain terminal) of the second transistor 402 through a resistive device 404. The second terminal of the first transistor 401 may be used as an output terminal of the push-pull circuit 400. A second terminal (e.g. a source terminal) of the second transistor 402 may be coupled to the second terminal T2 to be connected to the reference ground signal VSS. A control terminal (e.g. a gate terminal) of the first transistor 401 and a control terminal (e.g. a gate terminal) of second transistor 402 may be coupled to form the input terminal n6 of the push-pull circuit 400. The timing/filter capacitor 403 may be coupled between the output terminal of the push-pull circuit 400 and the second terminal T2. The inverter 405 may be coupled between the output terminal of the push-pull circuit 400 and the output terminal n7 of the timing/filter circuit 306. The predetermined period td may be set by adjusting a resistance of the resistive device 404 and a capacitance of the timing/filter capacitor 403.

According to the exemplary embodiment of FIG. 3, the synchronization control module 213 may further comprise: a voltage tolerance circuit 307 coupled between the following output terminal n2 of the voltage following protection module 211 (or the first terminal T1 in embodiments not including the voltage following protection module 211) and the timing/filtering circuit 306. The voltage tolerance circuit 307 may be configured to provide voltage protection for other circuits within the synchronous control module 213 (including, for example, but not limited to, the timing/filter circuit 306) when the input signal VCC or the following output signal Vn2 (using the reference ground signal VSS as a reference) is higher than a second predetermined voltage value $V_M$. In one embodiment, the second predetermined voltage value $V_M$ may be set in the range of 2.5V to 5.5V. In another embodiment, the second predetermined voltage value $V_M$ may be set in the range of 3V to 5V. In the exemplary embodiment of FIG. 3, the voltage tolerance circuit 307 illustrated as a transistor 307 may have breakdown voltages higher than the second predetermined voltage value $V_M$ and may be configured to be coupled to the following output n2 (or the first terminal T1 in embodiments not including the voltage following protection module 211) at its first terminal, coupled to the timing/filter circuit 306 at its second terminal and coupled to a bias voltage $V_{BIAS}$ at its control terminal. One of ordinary skill in the art should understand that this is just an example and not intended to be limiting. The voltage tolerance circuit 307 may comprise any appropriate device or circuitry that can sustain a voltage higher than the second predetermined voltage value $V_M$. In applications where the input signal VCC or the following output signal Vn2 (using the reference ground signal VSS as a reference) is lower than the second predetermined voltage value $V_M$, the synchronization control module 213 may not need the voltage tolerance circuit 307.

According to the exemplary embodiment of FIG. 3, the synchronization control module 213 may optionally further comprise: a current sinking device 308 coupled between the input terminal n6 of the timing/filter circuit 306 and the second terminal T2. The current sinking device 308 may be used to provide a pull-down current I0 in a direction from the input terminal n6 of the timing/filter circuit 306 to the second terminal T2. In one embodiment, the pull-down current I0 may be in the range of 1 μA to 20 μA. In another embodiment, the pull-down current I0 may be in the range of 3 μA to 15 μA. In one embodiment, the pull-down current I0 may be in the range of 5 μA to 10 μA. The current sinking device 308 is schematically illustrated as a first current source 308 in the embodiment of FIG. 3. One of ordinary skill in the art should understand that this is just an example and not intended to be limiting. The current sinking device 308 may comprise any appropriate device or circuitry that can provide a pull-down current I0 in the direction from the input terminal n6 of the timing/filter circuit 306 to the second terminal T2, for example, resistive devices or transistors, etc.

According to the exemplary embodiment of FIG. 3, the synchronization control module 213 may optionally further comprise: a current capability detection circuit at least coupled between the following output terminal n2 of the voltage following protection module 211 (or the first terminal T1 in embodiments not including the voltage following protection module 211) and the second terminal T2. The current capability detection circuit may be used to detect whether the current ICC flowing through the first terminal T1 is greater than the predetermined current value I1. If the current ICC flowing through the first terminal T1 is greater than the predetermined current value I1 (or when the duration of the current ICC flowing through the first terminal T1 being higher than the predetermined current value I1 is longer than the predetermined period td), then the first terminal T1 has a sufficient current supply capability to the second terminal T2, which indicates that the low side switch QL is ON. In the embodiment of FIG. 3, the current capability detection circuit may comprise a controllable discharge device 312 and a discharge control circuit 313. The controllable discharge device 312 may be coupled between the following output terminal n2 of the voltage following protection module 211 (or the first terminal T1 in embodiments not including the voltage following protection module 211) and the second terminal T2. The controllable discharge device 312 may be controlled to turn on or cut off the discharge path from the first terminal T1 to the second terminal T2 and to provide a discharge current of the predetermined current value I1 in a direction from the first terminal T1 to the second terminal T2 when the discharge path is turned on. In response to each rising edge of the input signal VCC relative to the reference ground signal VSS, the discharge control circuit 313 may be configured to generate one pulse of a discharge control signal Vn8 with a pulse width of the predetermined period td. The discharge control signal Vn8 may be used to trigger the controllable discharge device 312 to turn on the discharge path during the predetermined period td and to cut off the discharge path in other time. In the embodiment of FIG. 3, the discharge control circuit 313 may be configured to be coupled to the input terminal n6 of the timing/filter circuit 306 at its first terminal and be coupled to the output terminal n7 of the timing/filter circuit 306 at its second terminal. The discharge control circuit 313 may be configured to perform an AND logic operation to the signal Vn6 at the input terminal n6 of the timing/filter circuit 306 and an inverse signal of the synchronization control signal SN to provide the discharge control signal Vn8 to the controllable discharge device 312 at an output terminal n8 of the discharge control circuit 313. Each time when the logic state of the input signal VCC changes to logic high relative to the reference ground signal VSS, the discharge control signal Vn8 generates one pulse with the pulse width of the predetermined period td in response to each rising edge of the input signal VCC, so the discharge control signal Vn8 can be used to allow the controllable discharge device 312 to keep providing the discharge current of the predetermined current value I1 in the direction from the first terminal T1 to the second terminal T2 during the predetermined period td starting from moment when the logic state of the input signal VCC changes to logic high relative to the reference ground signal VSS. One of ordinary skill in the art should understand that this is just to provide an example and not intended to be limiting, in other embodiments of the present invention, the current capability detection circuit may comprise any appropriate device or circuitry that can provide the discharge current of the predetermined current value I1 in the direction from the first terminal T1 to the second terminal T2 during the predetermined period td starting from the moment when the logic state of the input signal VCC changes to logic high relative to the reference ground signal VSS.

Figure 5:
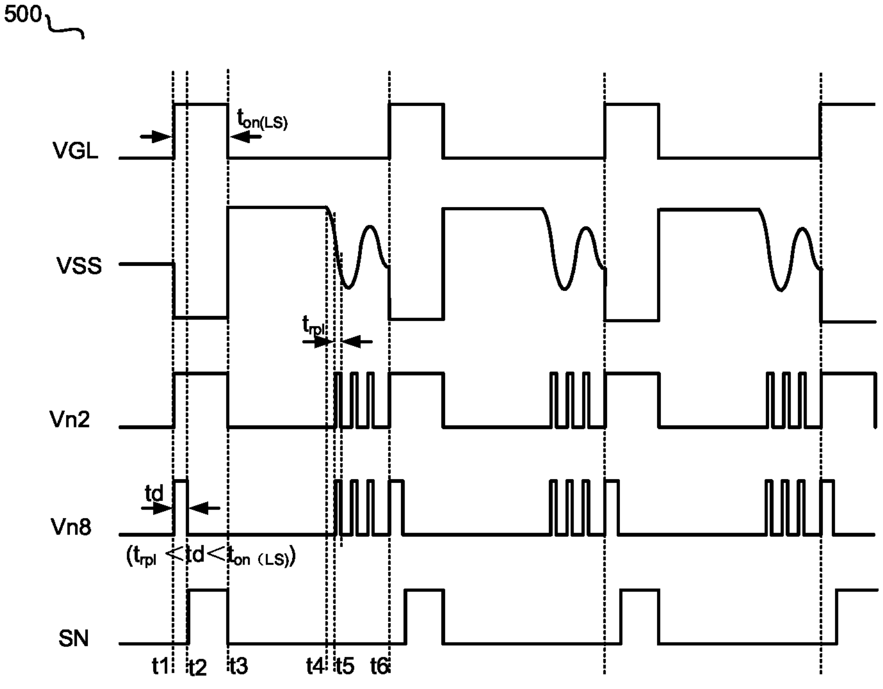
FIG. 5 illustrates a waveform diagram 500 showing waveforms of several signals in a synchronization control module 213 in accordance with an embodiment of the present invention.

To provide better understanding of the embodiments, FIG. 5 schematically illustrates a waveform diagram 500 showing waveforms of several signals in accordance with the embodiments where the synchronization control module 213 includes the controllable discharge device 312 and the discharge control circuit 313. It should be noted that, in FIG. 5, the waveforms of the low side switch driving signal VGL and the reference ground signal VSS are plotted using the reference ground PGND of the power converter 100 as the reference ground potential, while the waveforms of the following output signal Vn2, the discharge control signal Vn8, and the synchronization control signal SN are plotted using the reference ground signal VSS as the reference ground potential. As can be seen in FIG. 5, at a moment t1 when the low side switch driving signal VGL changes to a set logic state (e.g. logic high) relative to the reference ground PGND of the power converter 100 to turn the low side switch QL ON, the reference ground signal VSS (in the embodiment of the present invention, VSS is also the signal at the common connection SW) changes to logic low relative to the reference ground PGND of the power converter 100, thus the input signal VCC changes to logic high relative to the reference ground signal VSS, and following output signal Vn2 (in the embodiments including the voltage following protection module 211) follows and changes to logic high. However, for example, as reflected by waveforms between a moment t4 to a moment t6 in FIG. 5, the reference ground signal VSS may oscillate due to the primary winding Lp and a parasitic capacitance at the common connection SW. Thus, as reflected by waveforms at the moment t4, the input signal VCC may changes to logic high relative to the reference ground signal VSS when this reference ground signal VSS goes low. However, such changes of waveforms are not due to the low side switch QL being ON, so it is necessary to distinguish this kind of changes from changes of waveforms at the moment t1 to avoid misjudging an operation state of the low side switch QL. Typically, if the input signal VCC changes to logic high relative to the reference ground signal VSS due to the reference ground signal VSS oscillation (which may be also referred to as a noise pulse in this invention), then a duration of the noise pulse $t_{rpl}$ is shorter than a conduction time $t_{on(LS)}$ of the low side switch QL, and the first terminal T1 has a lower current supply capability to the second terminal T2 compared to the current supply capability when the low side switch QL is ON. According to embodiments of the present invention, the predetermined period td can be set to be longer than the duration of the noise pulse $t_{rpl}$ and shorter than the conduction time $t_{on(LS)}$ of the low side switch QL (or shorter than the minimum conduction time of the low side switch QL), i.e., $t_{rpl}<td<t_{on(LS)}$. Thus, starting from the rising edge (e.g. the moment t1) of the input signal VCC relative to the reference ground signal VSS, if the state of input signal VCC being logic high relative to the reference ground signal VSS can maintain for more than the predetermined period td, then the timing/filtering circuit 306 triggers the synchronization control signal SN to change to the disable logic state (e.g. illustrated as logic high in FIG. 5) to indicate that the low side switch QL is ON at the end of the predetermined period td (labeled as a moment t2 in FIG. 5). In such way, said misjudging of the operation state of the low side switch QL can be avoid. In embodiments where the synchronization control module 213 includes the controllable discharge device 312 and the discharge control circuit 313, the discharge control signal Vn8 may be configured to generate one pulse with the pulse width of the predetermined period td in response to each rising edge of input signal VCC relative to the reference ground signal VSS to control the controllable discharge device 312 to provide the discharge current of the predetermined current value I1 in the direction from the first terminal T1 to the second terminal T2. In such situation, if the duration of the input signal VCC being logic high relative to the reference ground signal VSS can still exceed the predetermined period td, it means that the current ICC flowing through the first terminal T1 is greater than the predetermined current value I1, such good current supply performance can only occur when the low side switch QL is ON. The accuracy of judging of the operation state of the low side switch QL can be ensured in this way. In addition, the controllable discharge device 312 and the discharge control circuit 313 may help to speed up the discharging of the noise pulse and thus shorten the duration of the noise pulse $t_{rpl}$, which facilitates the setting of the predetermined period td during a design process. In particular, when the power converter 100 is operating at light load (i.e., a load of the power converter 100 has a relatively low demand on an output current), the conduction time $t_{on(LS)}$ of the low side switch QL may be relatively short, in such situation, shortening the duration of the noise pulse $t_{rpl}$ helps the predetermined period td to fulfil the requirement $t_{rpl}<td<t_{on(LS)}$ easier. In one embodiment, the predetermined period td may be in the range of 100 ns to 500 ns, in another embodiment, the predetermined period td may be in the range of 150 ns to 500 ns, or in still another example it may be in the range of 150 ns to 300 ns.

In the exemplary embodiment of FIG. 3, the controllable discharge device 312 may comprise a controllable transistor 309 and a second current source 310. The controllable transistor 309 may be configured to be coupled to the following output n2 of the voltage following protection module 211 (or coupled to the first terminal T1 when used in embodiments which do not include the voltage following protection module 211) at its first terminal, be coupled to the second terminal T2 at its second terminal and be coupled to the output terminal n8 of the discharge control circuit 313 to receive the discharge control signal Vn8 at its control terminal. The second current source 310 may be coupled between the second terminal of the controllable transistor 309 and the second terminal T2, and configured to provide the current of the predetermined current value I1 in the direction to the second terminal T2. Each pulse of the discharge control signal Vn8 with the pulse width of the predetermined period td which generated in response to each rising edge of input signal VCC relative to a reference ground signal VSS can turn on the controllable transistor 309 during the predetermined period td, therefore the discharge current of the predetermined current value I1 in the direction from the first terminal T1 to the second terminal T2 can be provided by the second current source 310 during the predetermined period td. One of ordinary skill in the art should understand that this is just an example and not intended to be limiting. The controllable discharge device 312 may comprise any appropriate device or circuitry that can be controlled to turn on or cut off the discharge path from the first terminal T1 to the second terminal T2 and to provide the discharge current of the predetermined current value I1 in the direction from the first terminal T1 to the second terminal T2 when the discharge path is turned on.

In the exemplary embodiment of FIG. 3, the discharge control circuit 313 may comprise an inverter 311 and an AND logic operation circuit 314. An input terminal of the inverter 311 may be coupled to the output terminal n7 of timing/filter circuit 306 to receive the synchronization control signal SN, an output terminal of the inverter 311 may be coupled to a first input terminal of the AND logic operation circuit 314. A second input terminal of the AND logic operation circuit 314 may be coupled to the input terminal n6 of the timing/filter circuit 306 to receive the logic state characterization signal Vn6. The AND logic operation circuit 314 may be configured to perform an AND logic operation to the logic state characterization signal Vn6 and the synchronization control signal SN and to generate the discharge control signal Vn8 at the output terminal of the AND logic operation circuit 314. Optionally, the discharge control circuit 313 may further comprise two series-connected inverters coupled between the input terminal n6 of the timing/filter circuit 306 and the second input terminal of the AND logic operation circuit 314. One of ordinary skill in the art should understand that this is just an example and not intended to be limiting. The discharge control circuit 313 may comprise any appropriate device or circuitry that can generate one pulse with the pulse width of the predetermined period td in response to each rising edge of input signal VCC relative to the reference ground signal VSS.

In accordance with an exemplary embodiment of FIG. 2, the high side switch control circuit 120 may further comprise a logic control module 220 and a driver 230. In an example, the logic control module 220 and the driver 230 may be powered by the regulated voltage signal VDD from the power supply/synchronization unit 210. The logic control module 220 may be configured to at least receive the synchronization control signal SN and further configured to provide a control signal DR to the driver 230 at least partially based on the synchronization control signal SN. The driver 230 may be configured to enhance the driving capability of the control signal DR to provide the high side switch driving signal VGH. For instance, the logic control module 220 may be configured to set the control signal DR at logic low to lock the high side switch driving signal VGH at the reset logic state (e.g. logic low) so as to keep the high side switch OFF when the synchronization control signal SN is at the first logic level (e.g. logic high) which indicates that the low side switch is ON. The logic control module 220 may be further configured to enable/allow the control signal DR to switch between logic high and logic low according to other signals (e.g. a current sense signal VCS which indicates a current flowing through the high side switch QH) input to the logic control module 220 and thus enable/allow the high side switch driving signal VGH to switch between the set logic state (e.g. logic high) and the reset logic state (e.g. logic low) so as to enable/allow the high side switch QH to perform ON and OFF switching when the synchronization control signal SN is at the second logic level (e.g. logic low) which indicates that the low side switch is OFF.

While some embodiments of the present invention have been described in detail above, it should be understood, of course, these embodiments are for exemplary illustration only and are not intended to limit the scope of the present invention. Various modifications are contemplated and they obviously will be resorted to by those skilled in the art without departing from the spirit and the scope of the invention.

The invention claimed is:

1. A switch control circuit, comprising:

a first terminal, configured as an input terminal of the switch control circuit to receive an input signal;

a second terminal, configured as a reference ground terminal of the switch control circuit and being operable to be coupled to a common connection of a first power switch and a second power switch when the switch control circuit is used in a power converter; and a third terminal, configured as an output terminal of the switch control circuit to provide a driving signal adapted to be configured to drive the first power switch to perform on and off switching; wherein the switch control circuit is configured to draw power from the input signal received at the first terminal, and further configured to detect whether the second power switch is ON or OFF when being used in the power converter and to control a logic state of the driving signal based on a logic state of the input signal relative to a reference ground signal at the second terminal or based on whether a current flowing through the first terminal is larger than a predetermined current value.

2. The switch control circuit of claim 1, being further configured to lock/keep the driving signal at a reset logic state when the input signal is logic high relative to the reference ground signal or when the current flowing through the first terminal is larger than the predetermined current value.

3. The switch control circuit of claim 1, being further configured to lock/keep the driving signal at a reset logic state when a duration of the input signal being logic high relative to the reference ground signal is longer than a predetermined period or when a duration of the current flowing through the first terminal being larger than the predetermined current value is longer than the predetermined period.

4. The switch control circuit of claim 1, being further configured to enable/allow the driving signal to switch between a reset logic state and a set logic state when the input signal is logic low relative to the reference ground signal.

5. The switch control circuit of claim 1, further comprising:

a synchronization control module, coupled to the first terminal and the second terminal, and configured to generate a synchronization control signal based on the input signal and the reference ground signal, wherein the synchronization control module is configured to allow the synchronization control signal to be at a disable logic state to lock/keep the driving signal at a reset logic state when the input signal is logic high relative to the reference ground signal or when the current flowing through the first terminal is larger than the predetermined current value.

6. The switch control circuit of claim 5, wherein the synchronization control module is further configured to allow the synchronization control signal to be at the disable logic state when a duration of the input signal being logic high relative to the reference ground signal is longer than a predetermined period or when a duration of the current flowing through the first terminal being larger than the predetermined current value is longer than the predetermined period.

7. The switch control circuit of claim 5, wherein the synchronization control module is further configured to allow the synchronization control signal to be at an enable logic state to enable/allow the driving signal to switch between a reset logic state and a set logic state when the input signal is logic low relative to the reference ground signal or when the input signal changes from logic high to logic low relative to the reference ground signal.

8. The switch control circuit of claim 1, further comprising:

a fourth terminal, configured to provide a regulated voltage signal when a capacitive energy storage device is coupled between the fourth terminal and the second terminal.

9. The switch control circuit of claim 8, further comprising:

a voltage regulation module, coupled to the first terminal, the second terminal and the fourth terminal, and further configured to provide the regulated voltage signal when the capacitive energy storage device is coupled between the fourth terminal and the second terminal.

10. The switch control circuit of claim 8, further comprising:

a power supply/synchronization unit, coupled to the first terminal, the second terminal and the fourth terminal, and configured to provide the regulated voltage signal when the capacitive energy storage device is coupled between the fourth terminal and the second terminal, and further configured to generate a synchronization control signal based on the input signal, wherein the synchronization control signal has a disable logic state which can lock/keep the driving signal at a reset logic state and an enable logic state which can enable/allow the driving signal to switch between the reset logic state and a set logic state.

11. The switch control circuit of claim 10, wherein the power supply/synchronization unit further comprises:

a voltage regulation module, coupled to the first terminal, the second terminal and the fourth terminal, and configured to provide the regulated voltage signal when the capacitive energy storage device is coupled between the fourth terminal and the second terminal; and a synchronization control module, coupled to the first terminal and the second terminal, and configured to generate the synchronization control signal based on the input signal and the reference ground signal, wherein the synchronization control module is configured to allow the synchronization control signal to be at the disable logic when the input signal is logic high relative to the reference ground signal or when the current flowing through the first terminal is larger than the predetermined current value, and is further configured to allow the synchronization control signal to be at the enable logic state when the input signal is logic low relative to the reference ground signal or when the input signal changes from logic high to logic low relative to the reference ground signal.

12. The switch control circuit of claim 11, wherein the synchronization control module further comprises:

a timing/filter circuit, coupled to the first terminal at its input terminal and configured to provide the synchronization control signal at its output terminal, wherein the timing/filter circuit is further configured to start to time the duration of the input signal being logic high relative to the reference ground signal from a moment when the logic state of the input signal changes to logic high relative to the reference ground signal, if the duration of the input signal being logic high relative to the reference ground signal is shorter than a predetermined period, the timing/filter circuit is configured to allow the synchronization control signal to be at the enable logic state, and if the duration of the input signal being logic high relative to the reference ground signal is longer than the predetermined period, the timing/filter circuit is configured to allow the synchronization control signal to be at the disable logic state.

13. The switch control circuit of claim 12, wherein the timing/filter circuit is further configured to allow the synchronization control signal to be at the enable logic state when the input signal is logic low relative to the reference ground signal or when the input signal changes from logic high to logic low relative to the reference ground signal.

14. The switch control circuit of claim 12, wherein the synchronization control module further comprises:

a current capability detection circuit, at least coupled to the first terminal and the second terminal and configured to detect whether the current flowing through the first terminal is greater than the predetermined current value, wherein the current capability detection circuit is further configured to provide a discharge current of the predetermined current value in a direction from the first terminal to the second terminal during the predetermined period starting from the moment when the logic state of the input signal changes to logic high relative to the reference ground signal.

15. The switch control circuit of claim 12, wherein the synchronization control module further comprises:

a controllable discharge device, coupled between the first terminal and the second terminal, wherein the controllable discharge device is controlled to turn on or cut off a discharge path from the first terminal to the second terminal and to provide a discharge current of the predetermined current value in a direction from the first terminal to the second terminal when the discharge path is turned on; and a discharge control circuit, configured to generate one pulse of a discharge control signal with a pulse width of the predetermined period in response to each rising edge of the input signal relative to the reference ground signal, wherein the discharge control signal is used to trigger the controllable discharge device to turn on the discharge path during the predetermined period and to cut off the discharge path in other time.

16. The switch control circuit of claim 1, the first terminal is further configured to receive the input signal through a one direction conductive device, wherein the one direction conductive device is configured to be conductive in a direction from outside to the first terminal and to be reverse-blocked in a direction out of the first terminal, and wherein the one direction conductive device has a reverse breakdown voltage higher than a predetermined voltage value.

17. A power converter comprising:

a first switch having a first terminal, a second terminal and a control terminal, wherein the first terminal of the first switch is coupled to an input terminal of the power converter;

a second switch having a first terminal, a second terminal and a control terminal, wherein the first terminal of the second switch is coupled to the second terminal of the first switch to form a common connection, and wherein the second terminal of the second switch is coupled to a reference ground of the power converter; and a first switch control circuit having a first terminal configured to receive an input signal, a second terminal coupled to the common connection, and a third terminal coupled to the control terminal of the first switch, wherein the first switch control circuit is configured to draw power from the input signal and to detect whether the second switch is ON or OFF based on a logic state of the input signal relative to a reference ground signal at its second terminal or based on whether a current flowing through its first terminal is larger than a predetermined current value.

18. The power converter of claim 17, wherein the first switch control circuit is further configured to determine that it has detected the second switch is ON when the input signal is logic high relative to the reference ground signal or when the current flowing through its first terminal is larger than the predetermined current value.

19. The power converter of claim 17, wherein the first switch control circuit is further configured to determine that it has detected the second switch is ON when a duration of the input signal being logic high relative to the reference ground signal is longer than a predetermined period or when a duration of the current flowing through its first terminal being larger than the predetermined current value is longer than the predetermined period.

20. The power converter of claim 17, wherein the first switch control circuit is further configured to determine that it has detected the second switch is OFF when the input signal is logic low relative to the reference ground signal.

* * * * *